United States Patent
Pargoe

(10) Patent No.: US 10,210,475 B2
(45) Date of Patent: *Feb. 19, 2019

(54) SYSTEMS, DEVICES, AND/OR METHODS FOR MANAGING DRONE DELIVERIES

(71) Applicant: Brandon Thomas Pargoe, Midlothian, VA (US)

(72) Inventor: Brandon Thomas Pargoe, Midlothian, VA (US)

(73) Assignee: Drone Delivery Systems Corporation, Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,696

(22) Filed: Feb. 8, 2016

(65) Prior Publication Data
US 2017/0228692 A1 Aug. 10, 2017

(51) Int. Cl.
*A47G 29/12* (2006.01)
*A47G 29/16* (2006.01)
(Continued)

(52) U.S. Cl.
CPC ....... *G06Q 10/0836* (2013.01); *A47G 29/141* (2013.01); *B64C 39/024* (2013.01); *B65D 43/16* (2013.01); *B65D 43/26* (2013.01); *B65D 81/3813* (2013.01); *G06Q 10/0832* (2013.01); *G07C 9/00563* (2013.01); *G07C 9/00896* (2013.01); *H04W 4/021* (2013.01); *H04W 4/80* (2018.02); *A47G 2029/147* (2013.01);
(Continued)

(58) Field of Classification Search
CPC ....... G06Q 10/0836; A61J 1/00; A47G 29/14; A47G 29/1214; A47G 29/141; A47G 29/16; A47G 2029/1226; A47G 2029/148; A47G 2029/149; B64C 39/02; B65D 5/2047; B65D 5/2066; B65D 27/22; B65D 5/18; B65D 5/64; B65D 5/66; B65D 5/68; B65D 43/14; B65D 43/16; B65D 43/26; B65D 81/3813
USPC ................... 229/107, 112, 113, 116; 232/20
See application file for complete search history.

(56) References Cited

U.S. PATENT DOCUMENTS

| 4,132,345 A * | 1/1979 | Nielsen | B65D 5/20 229/108 |
| 5,774,053 A * | 6/1998 | Porter | A47G 29/141 232/19 |

(Continued)

FOREIGN PATENT DOCUMENTS

| JP | 09302991 A * | 11/1997 | E04H 9/16 |
| WO | WO 2015/160672 A1 * | 10/2015 | B64C 39/02 |

OTHER PUBLICATIONS

Ze-hong, Sun et al., Multi-functional Parcel Delivery Locker System, Dec. 21, 2015, IEEE, International Conference on Computer and Computational Sciences (ICCCS), pp. 207-210. (Year: 2015).*

*Primary Examiner* — Michael P Harrington
*Assistant Examiner* — Rupangini Singh
(74) *Attorney, Agent, or Firm* — Williams Mullen; Thomas F. Bergert

(57) ABSTRACT

Certain exemplary embodiments can provide an AirBox constructed to receive deliveries from a drone. The AirBox can comprise an automatically openable lid; and a wireless receiver that is constructed to receive data concerning a delivery from the drone. The automatically openable lid can open to receive the delivery from the drone.

23 Claims, 20 Drawing Sheets

(51) Int. Cl.
*A47G 29/14* (2006.01)
*A47G 29/122* (2006.01)
*G06Q 10/08* (2012.01)
*B64C 39/02* (2006.01)
*G07C 9/00* (2006.01)
*H04W 4/021* (2018.01)
*B65D 43/16* (2006.01)
*B65D 43/26* (2006.01)
*B65D 81/38* (2006.01)
*H04W 4/80* (2018.01)

(52) U.S. Cl.
CPC .. *B64C 2201/042* (2013.01); *B64C 2201/128* (2013.01); *B64C 2201/201* (2013.01); *G07C 2009/0092* (2013.01)

(56) References Cited

U.S. PATENT DOCUMENTS

| | | | | |
|---|---|---|---|---|
| 5,954,264 A * | 9/1999 | Keller | ............... | A47G 29/1209 232/17 |
| 8,382,210 B1 * | 2/2013 | Fleck | ............... | B60B 7/04 301/37.102 |
| 2007/0194092 A1 * | 8/2007 | Donnelly | ............... | B65D 5/029 229/117.25 |
| 2010/0031573 A1 * | 2/2010 | Whiting | ............... | E05B 47/02 49/31 |
| 2010/0116875 A1 * | 5/2010 | Do | ............... | A47G 29/1209 232/17 |
| 2013/0111824 A1 * | 5/2013 | Rees | ............... | E04D 13/064 52/12 |
| 2014/0032034 A1 * | 1/2014 | Raptopoulos | ............... | G08G 5/0069 701/25 |
| 2014/0254896 A1 * | 9/2014 | Zhou | ............... | B25J 9/0006 382/124 |
| 2015/0120094 A1 * | 4/2015 | Kimchi | ............... | B64C 39/024 701/3 |
| 2015/0158599 A1 * | 6/2015 | Sisko | ............... | B64F 1/32 244/114 R |
| 2015/0245165 A1 * | 8/2015 | Chen | ............... | G06F 1/3253 455/41.2 |
| 2016/0084986 A1 * | 3/2016 | Zach | ............... | E04D 13/103 219/502 |
| 2016/0235236 A1 * | 8/2016 | Byers | ............... | A47G 29/14 |

\* cited by examiner

5000

6000

7000

8000

9000

10000

11000

12000

13000

14000

16000

17000

SYSTEMS, DEVICES, AND/OR METHODS FOR MANAGING DRONE DELIVERIES

CROSS-REFERENCES TO RELATED APPLICATIONS

This application claims priority to, and incorporates by reference herein in its entirety, U.S. Provisional Patent Application Ser. No. 62/264,082, filed Dec. 7, 2015. This application also claims priority to, and incorporates by reference herein in its entirety, U.S. Provisional Patent Application Ser. No. 62/266,027, filed Dec. 11, 2015.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
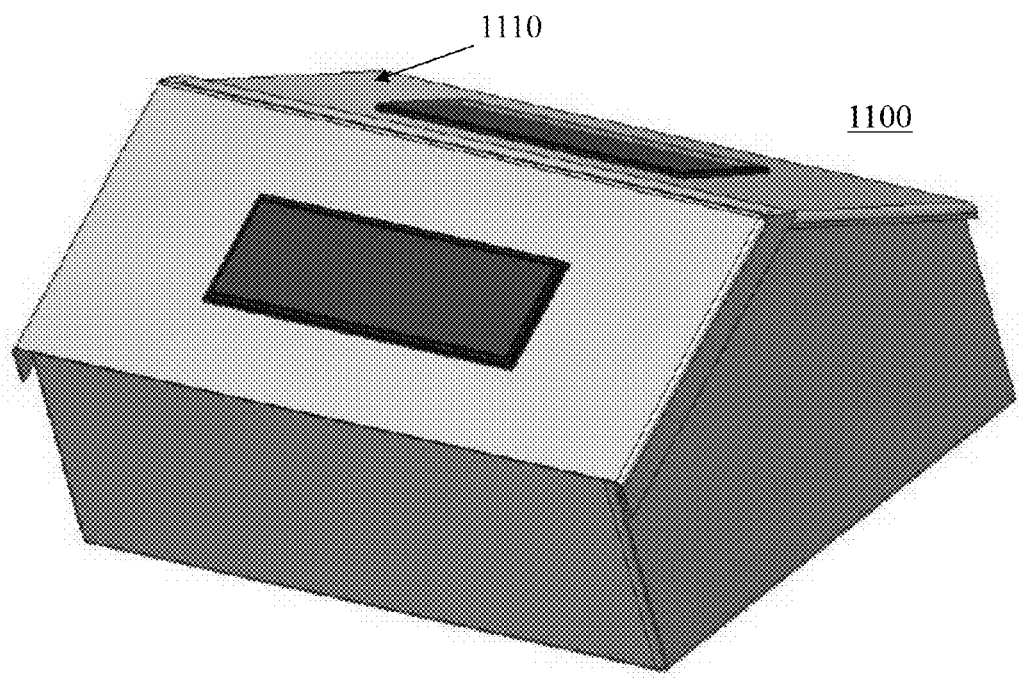
FIG. 1 is a perspective view of an exemplary embodiment of a system 1000.

Certain exemplary embodiments can provide a mailbox (i.e., an "AirBox") constructed to receive deliveries from unmanned aerial vehicles (i.e., drones). The AirBox can comprise an automatically openable lid; and a wireless receiver that is constructed to receive data concerning a delivery from the drone. The automatically openable lid can open to receive the delivery from the drone.

Certain exemplary embodiments accept items transported by drones. Use of an AirBox can reduce the chances of misplaced and/or damaged packages obtained via drone delivery. An AirBox is durable and easy to use, perfect for any household. Businesses can turn to the use of delivery drones to transport their merchandise. With the growing popularity of the use of drones, certain exemplary embodiments provide a specific container that can collect packages sent by drones in a secure manner. Drones can locate an AirBox anywhere in the world through the mailbox's GPS coordinates. The mailbox will then accept parcels from the drones and keep the items secure until a receiving user is ready to pick them up. The AirBox opens from the top, when a signal is received from a drone that is near and ready to deliver a package. The lid on the AirBox opens and accepts the package delivered by drone. The lid then closes and locks, keeping out thieves. The AirBox, can be opened by the owner, such as by key, to retrieve items delivered by drone. The AirBox lid "doors" can be solar powered, and heat can be generated to keep off heavy snow in extreme weather conditions. Solar power can keep the box operational from sunlight received during daylight hours, which can charge a rechargeable battery comprised by the AirBox. The AirBox is not only constructed for residential use, to securely and safely accept deliveries via drones, but can be used in third world countries, and/or hard to reach areas with poor roads. Certain exemplary embodiments can be used in natural disasters, times of political turbulence, war, and/or remote regions of the world. The AirBox can guide drones to its location, with beacon GPS, powered by a self-generating solar power lid. The AirBox lid opens once its senses a delivery via drone. The drone delivers a package, which can comprise survival supplies, food, prescriptions, medicine, and/or mail. The AirBox can securely and safely accept the delivery via drone, in its insulated and lockable container. The secure AirBox keeps thieves out, so the intended recipient receives their delivery when convenient to them. In times of natural disaster, an unmanned aerial vehicle, might be the only means to reach helpless victims. Victims can retrieve survival items from an AirBox, delivered by drone for each intended victim. In hard to reach areas or "slums", roads might be impassable, and delivery trucks unable to reach certain areas for months. Drones can deliver food, supplies, prescriptions or medical aid to a secure AirBox, intended for a particular individual, keeping thieves out. In the United States, the AirBox is the future "mailbox" for the everyday resident. The AirBox is a safe a secure way, a resident can receive "goods" delivered by drone, from retailers e.g., Amazon, Google, Walmart, and/or any drone delivery service provider. The AirBox can be personally owned by the End User, and is their identifier when ordering "goods" via drone. The GPS coordinates of the AirBox guide the drone to deliver safely to the person's residence. In major cities, around the World, transportation on roads with delivery trucks can be an expensive and potentially difficult way to deliver goods in a timely manner. In major congested cities, the AirBox can be of great value, being able to securely house prescriptions, when ordered by individuals, in need to weekly supplies of prescriptions to treat an illness of a patient. When elderly persons, or patients, can't drive to the pharmacy, or accept deliveries at the front door, the AirBox in an easy to reach area, on a balcony, or window sill, can receive prescriptions deliveries in a safe and secure manner, for the intended patient, in a convenient and easy to access area. Such deliveries are not delayed by roads, or traffic, making the delivery to the patient relatively efficient potentially extending lives.

In certain exemplary embodiments, the AirBox can receive food deliveries (e.g., pizza deliveries) securely in an insulated box. The AirBox can accept pizza delivery from any pizza delivery company, example Dominos, Pizza Hut, Papa John's, at a person's home. The AirBox, allows a pizza delivery drone to land and deliver, for example, two large pizzas, in a secure, and insulated "mailbox". The AirBox lid automatically opens responsive to a signal from a drone that is near. While the AirBox lid is open, the drone delivers the pizza to the AirBox, whereupon the lid securely closes. The insulated AirBox keeps delivered pizza warm, until retrieved by the customer.

FIG. 1 is a perspective view of an exemplary embodiment of a system 1000, which comprises an AirBox 1100 with an automatically openable lid 1110.

Figure 2:
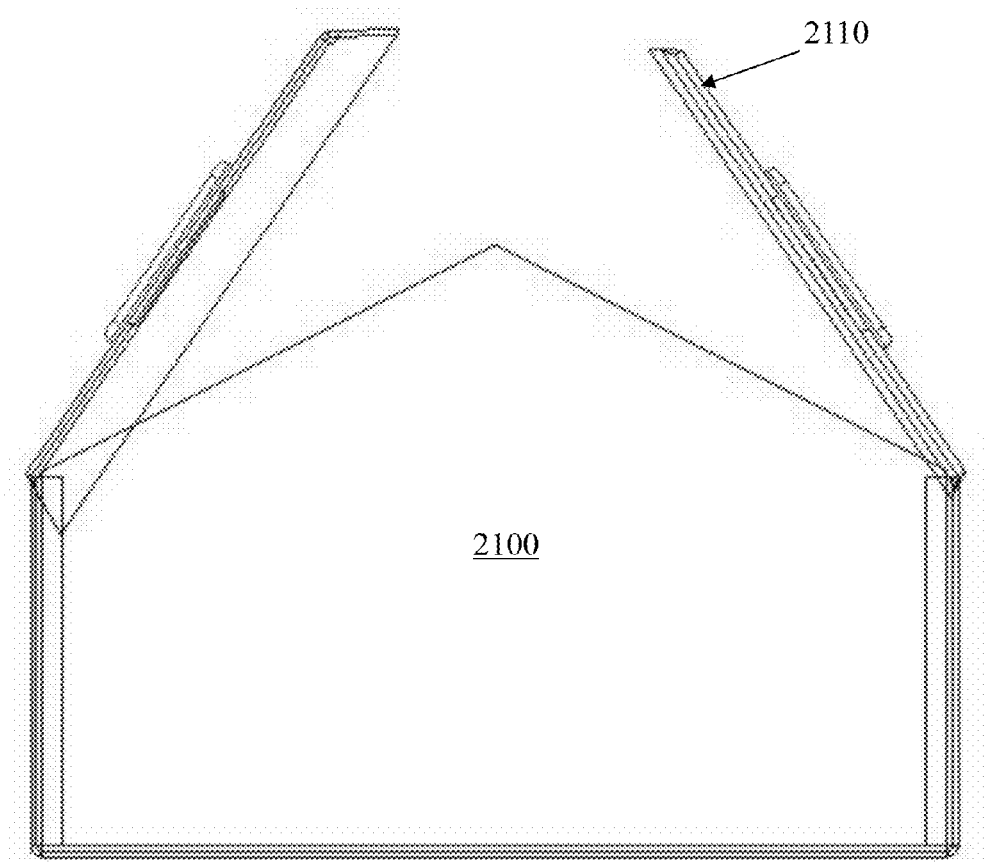
FIG. 2 is a side view of an exemplary embodiment of a system 2000.

FIG. 2 is a side view of an exemplary embodiment of a system 2000, which comprises an AirBox 2100 with an automatically openable lid 2110.

Figure 3:
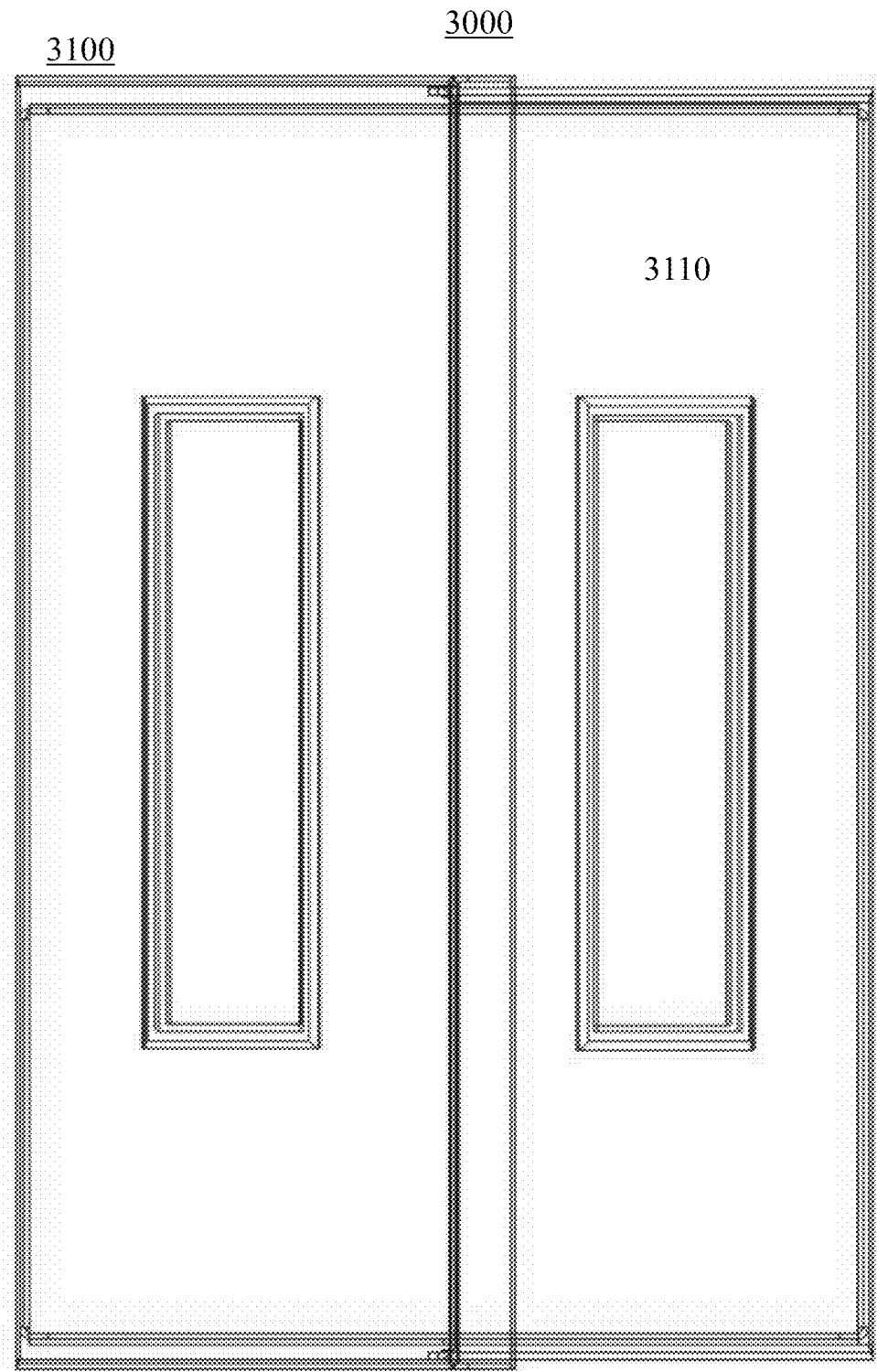
FIG. 3 is a plan view of an exemplary embodiment of a system 3000.

FIG. 3 is a plan view of an exemplary embodiment of a system 3000, which comprises an AirBox 3100 with an automatically openable lid 3110.

Figure 4:
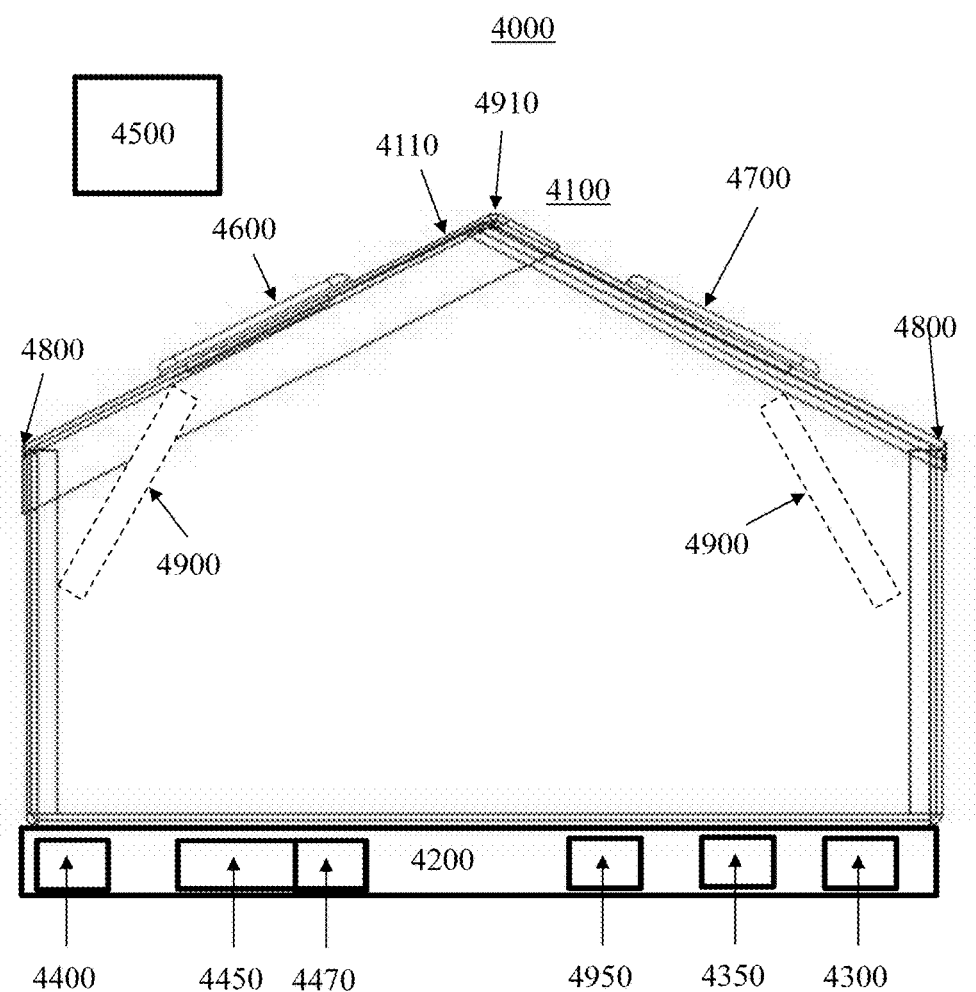
FIG. 4 is a side view of an exemplary embodiment of a system 4000.

FIG. 4 is a side view of an exemplary embodiment of a system 4000, which can comprise an AirBox 4100. AirBox 4100 can comprise and electronic portion 4200. In the illustrated embodiment electronic portion 4200 is shown on the bottom of AirBox 4100. In other embodiments, electronic portion 4200 can be located at or about any other portion of AirBox 4100. AirBox 4100 can comprise:

sheet metal;
an automatically openable lid 4110, which can comprise overlapping flaps as illustrated in FIG. 1, the overlapping flaps can be constructed to resist rain entry into AirBox 4100;
a wireless receiver 4300 that is constructed to receive data concerning a delivery from a drone 4500; in certain exemplary embodiments, wireless receiver 4300 can be an infrared communication device that receives signals from drone 4500; in other embodiments, wireless receiver 4300 can be a radio frequency communication device; wireless receiver 4300 can operate via Wi-Fi when a Wi-Fi network is available and via a Bluetooth low energy specification 3.0 or greater when no Wi-Fi network is available; and/or
a first information device 4400, wherein wireless receiver 4300 is constructed to communicate the data to first information device 4400;
responsive to the data, first information device 4400 can be constructed to:
 cause automatically openable lid 4110 to open to receive the delivery from drone 4500;
 cause automatically openable lid 4110 to close after receipt of the delivery from drone 4500; and/or
 cause system 4000 to enter a sleep mode until a signal is received from drone 4500.

Figure 5:
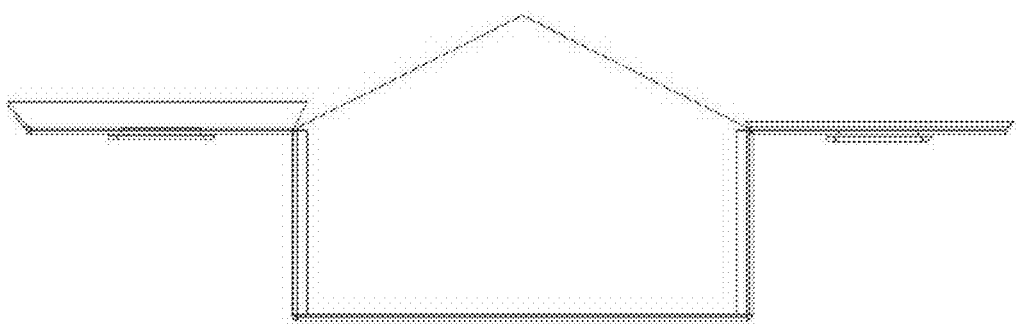
FIG. 5 is a side view of an exemplary embodiment of a system 5000.

System 4000 can be communicatively coupled to a second information device, such as information device 5100 of FIG. 5, which controls the delivery from drone 4500.

System 4000 can comprise:
a transmitter 4350 constructed to communicate a global positioning system determined location of the AirBox with the second information device controlling the delivery from drone 4500;
a solar panel 4600 constructed to provide energy to open automatically openable lid 4110;
a power supply 4450 comprising a rechargeable battery 4470, wherein power supply 4450 is constructed to provide electrical energy to first information device 4400 and to open automatically openable lid 4110;
a snow detector 4700, which can be constructed to cause automatically openable lid 4110 to open and/or be heated such that snow falls and/or melts off of automatically openable lid 4110;
hinges 4800 of automatically openable lid 4110, which can be installed to as to not reduce an internal volume of the AirBox;
automatically openable lid is opened via one or more actuators 4900 (e.g., dual actuators);
thermal insulation;
a heater 4950, which can be constructed to maintain an interior of AirBox 4100 within a predetermined temperature range;
a lock 4910 constructed to restrict access to AirBox 4100 from anyone except a user of AirBox 4100; in certain exemplary embodiments, lock 4910 can be opened via a key by a user; in other embodiments, lock 4910 can be opened via a biometric identifier of a user;

In certain exemplary embodiments, the delivery of drone 4500 can comprise at least one of food, pizza, mail, prescriptions, pharmaceuticals, survival supplies, packages, medicine, grocery, and/or a retail store item, etc.

FIG. 5 is a side view of an exemplary embodiment of a system 5000 with the lid open to receive a drone delivery and/or to retrieve a drone delivery.

Figure 6:
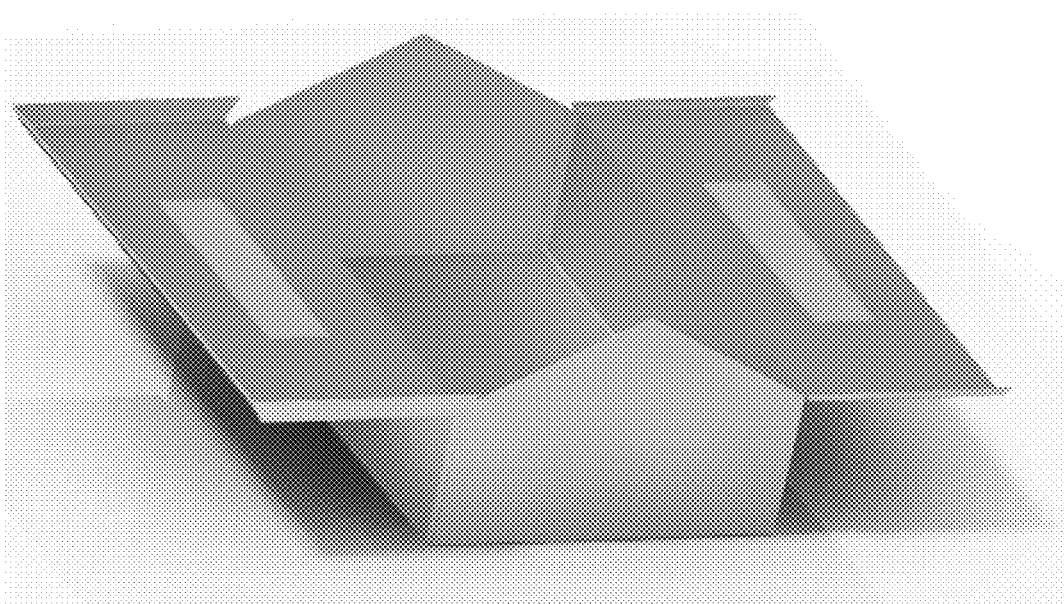
FIG. 6 is a perspective view of an exemplary embodiment of a system 6000.

FIG. 6 is a perspective view of an exemplary embodiment of a system 6000 with the lid open to receive a drone delivery and/or to retrieve a drone delivery.

Figure 7:
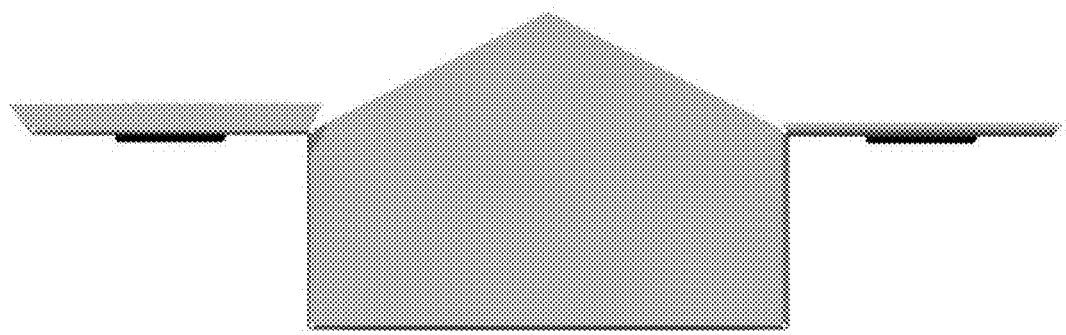
FIG. 7 is a side view of an exemplary embodiment of a system 7000.

FIG. 7 is a side view of an exemplary embodiment of a system 7000 with the lid open to receive a drone delivery and/or to retrieve a drone delivery.

Figure 8:
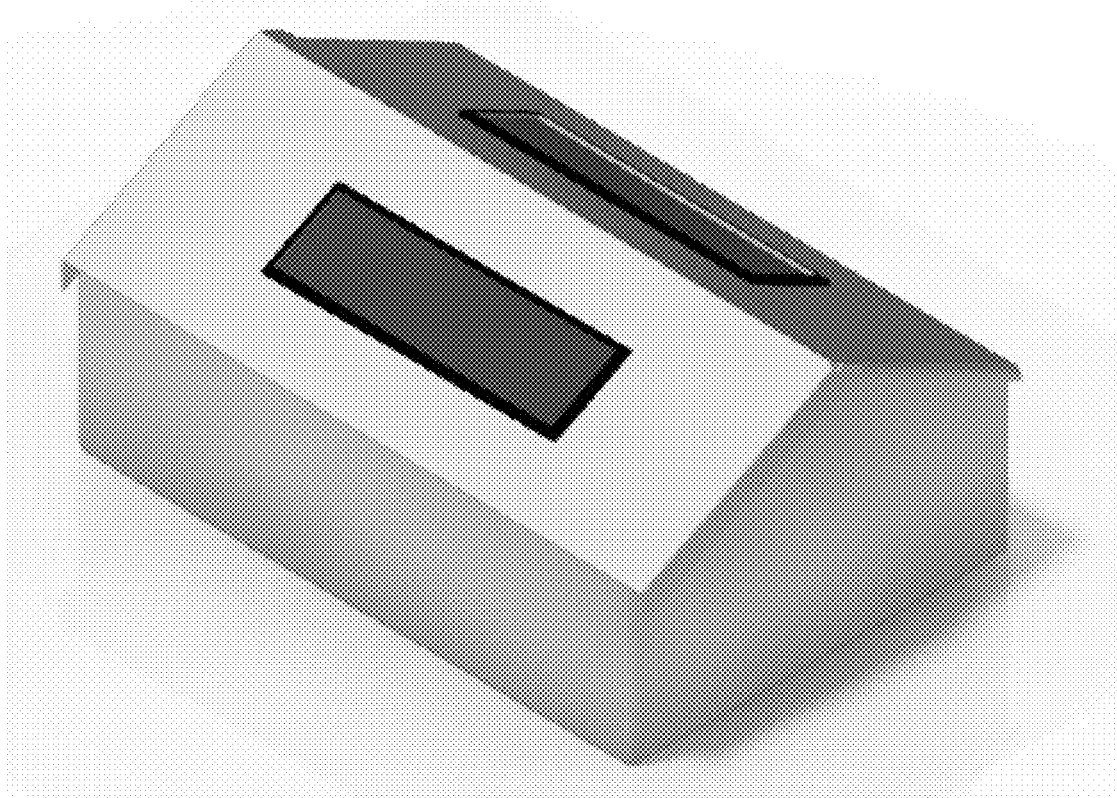
FIG. 8 is a perspective view of an exemplary embodiment of a system 8000.

FIG. 8 is a perspective view of an exemplary embodiment of a system 8000 with the lid closed.

Figure 9:
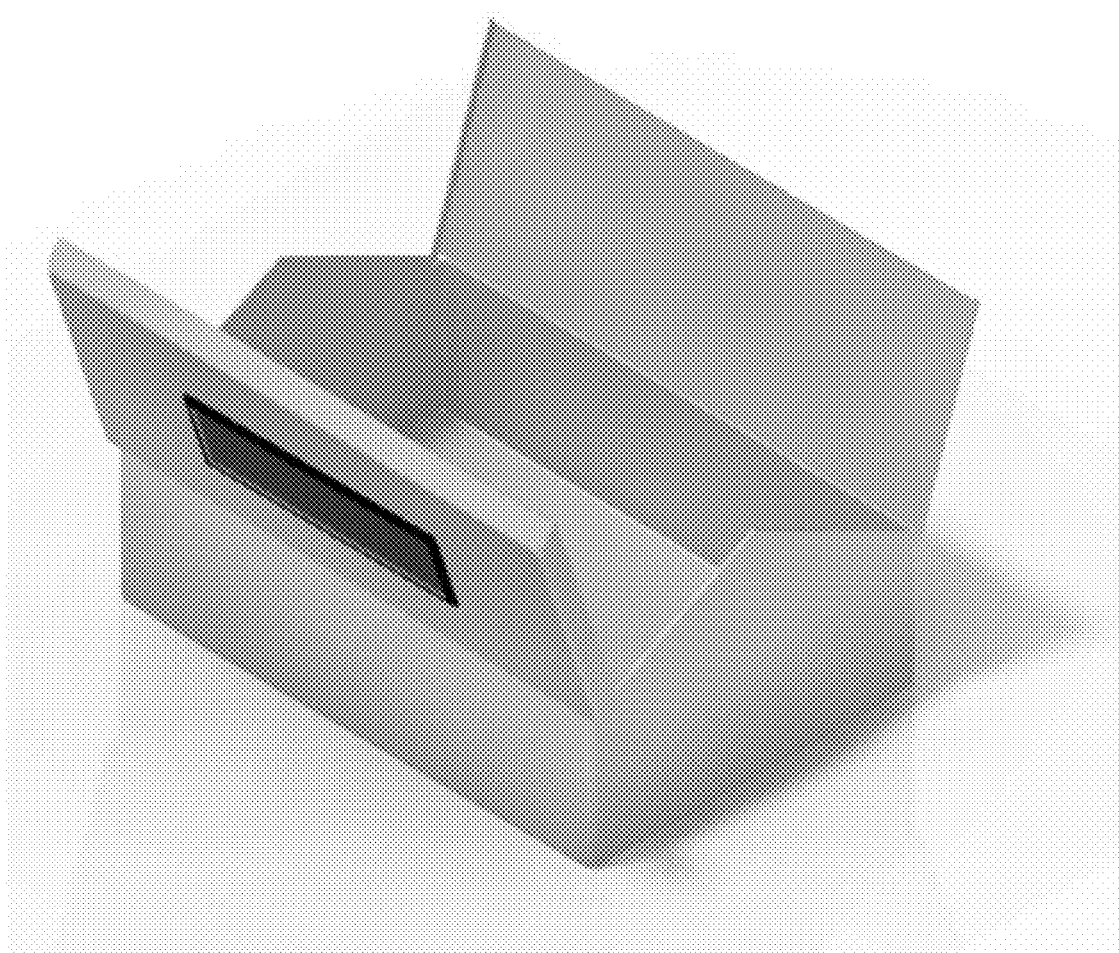
FIG. 9 is a perspective view of an exemplary embodiment of a system 9000.

FIG. 9 is a perspective view of an exemplary embodiment of a system 9000 with the lid open to receive a drone delivery and/or to retrieve a drone delivery.

Figure 10:
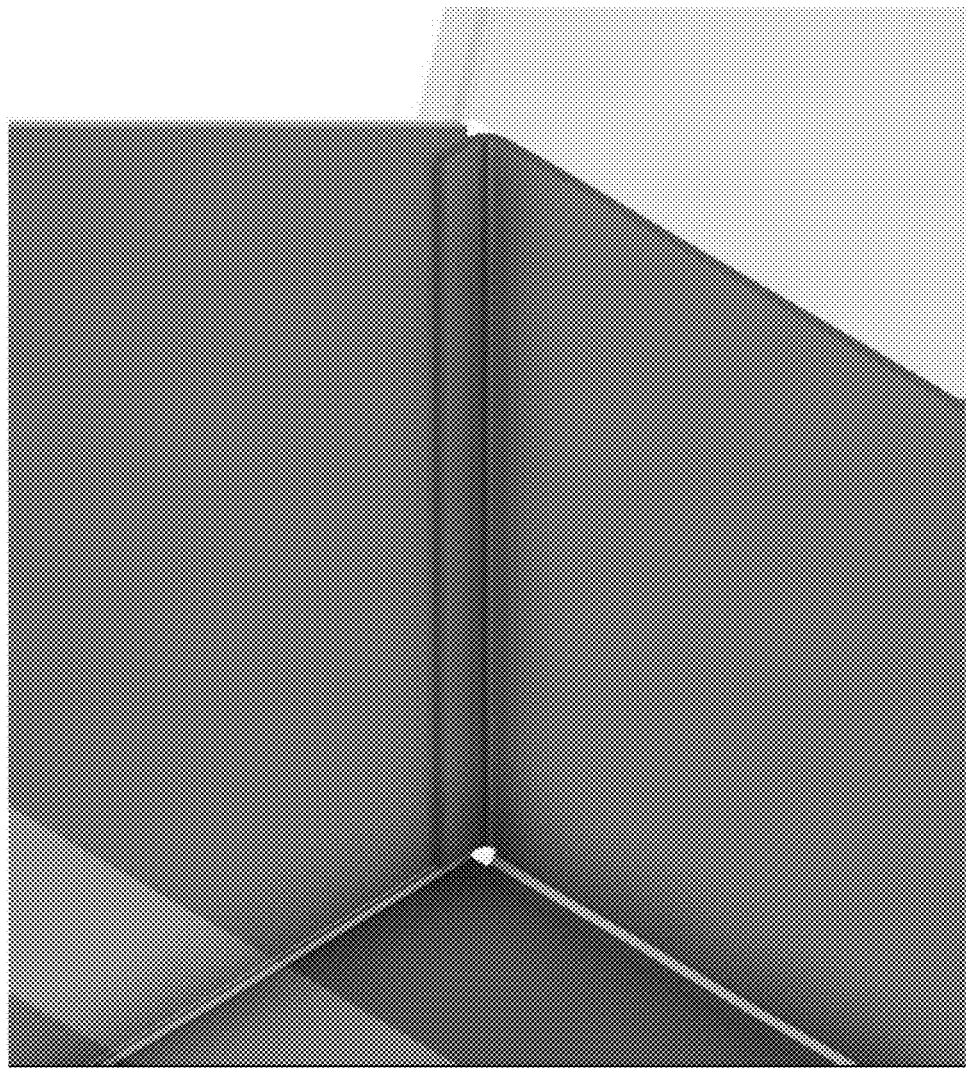
FIG. 10 is a perspective view of a portion of an exemplary embodiment of a system 10000.

FIG. 10 is a perspective view of a portion of an exemplary embodiment of a system 10000.

Figure 11:
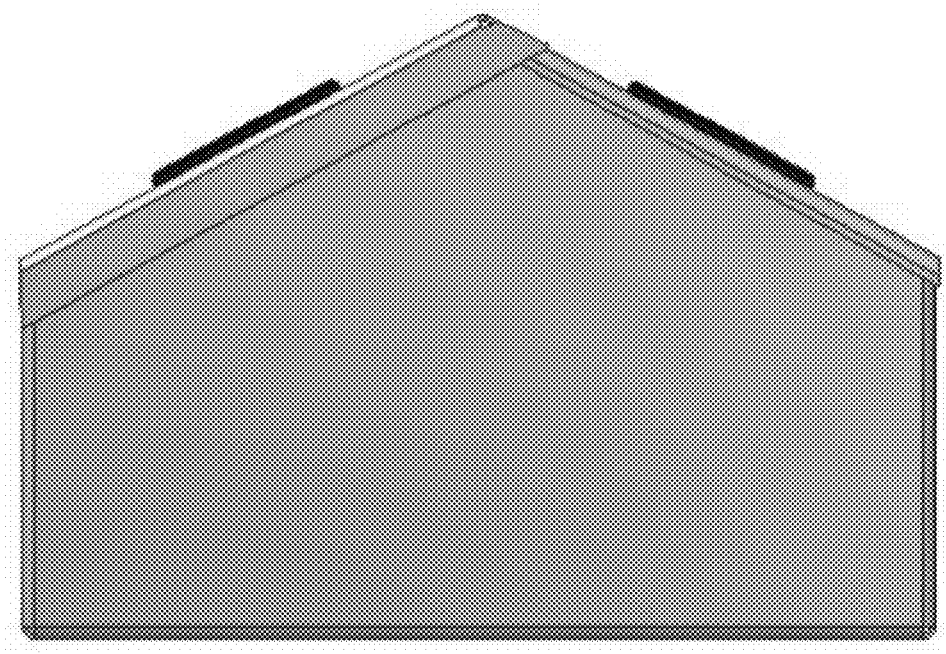
FIG. 11 is a side view of an exemplary embodiment of a system 11000.

FIG. 11 is a side view of an exemplary embodiment of a system 11000.

Figure 12:
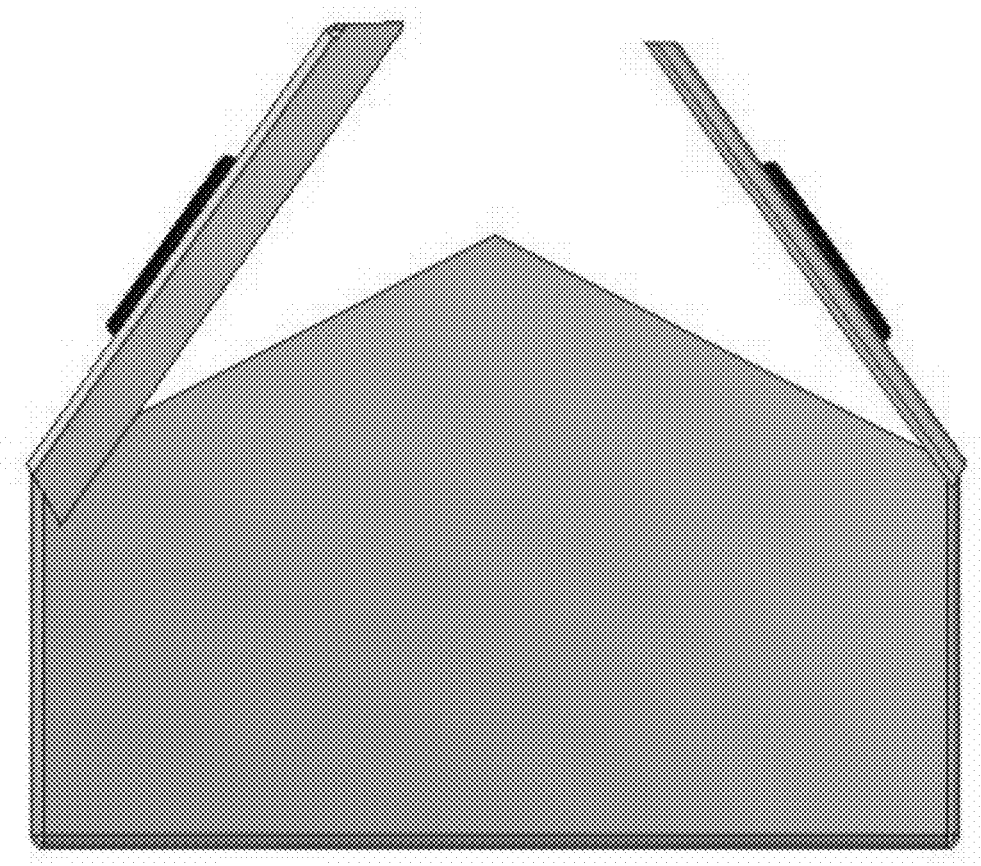
FIG. 12 is a side view of an exemplary embodiment of a system 12000.

FIG. 12 is a side view of an exemplary embodiment of a system 12000 with the lid partially open.

Figure 13:
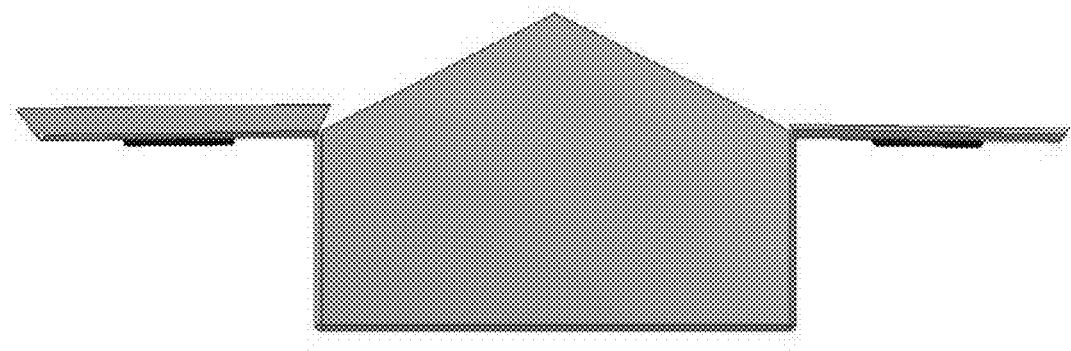
FIG. 13 is a side view of an exemplary embodiment of a system 13000.

FIG. 13 is a side view of an exemplary embodiment of a system 13000 with the lid fully open.

Figure 14:
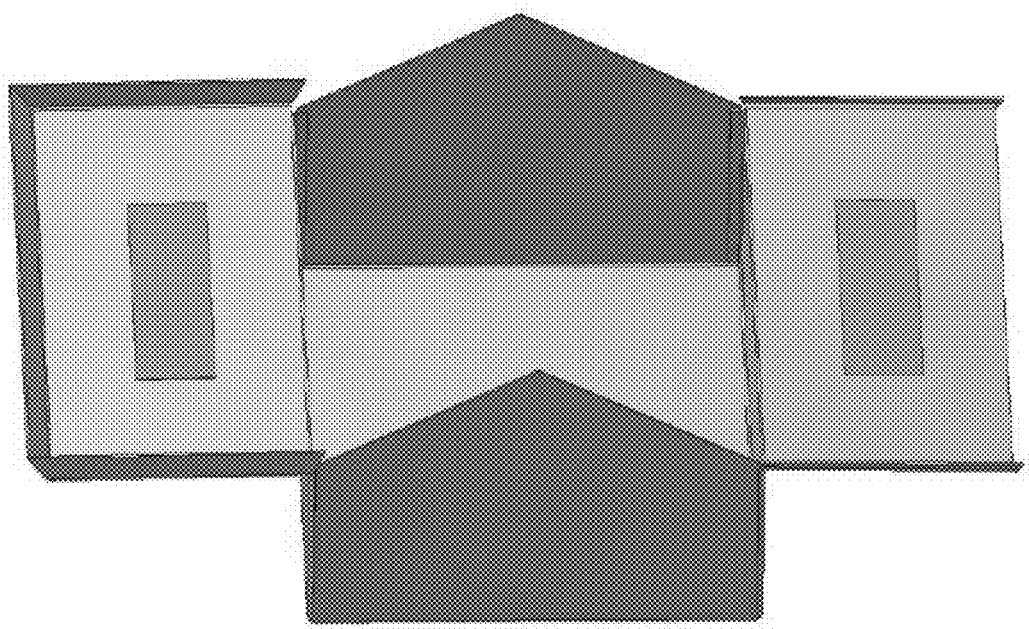
FIG. 14 is a perspective view of an exemplary embodiment of a system 14000 with the lid fully open.

FIG. 14 is a perspective view of an exemplary embodiment of a system 14000 with the lid fully open.

Figure 15:
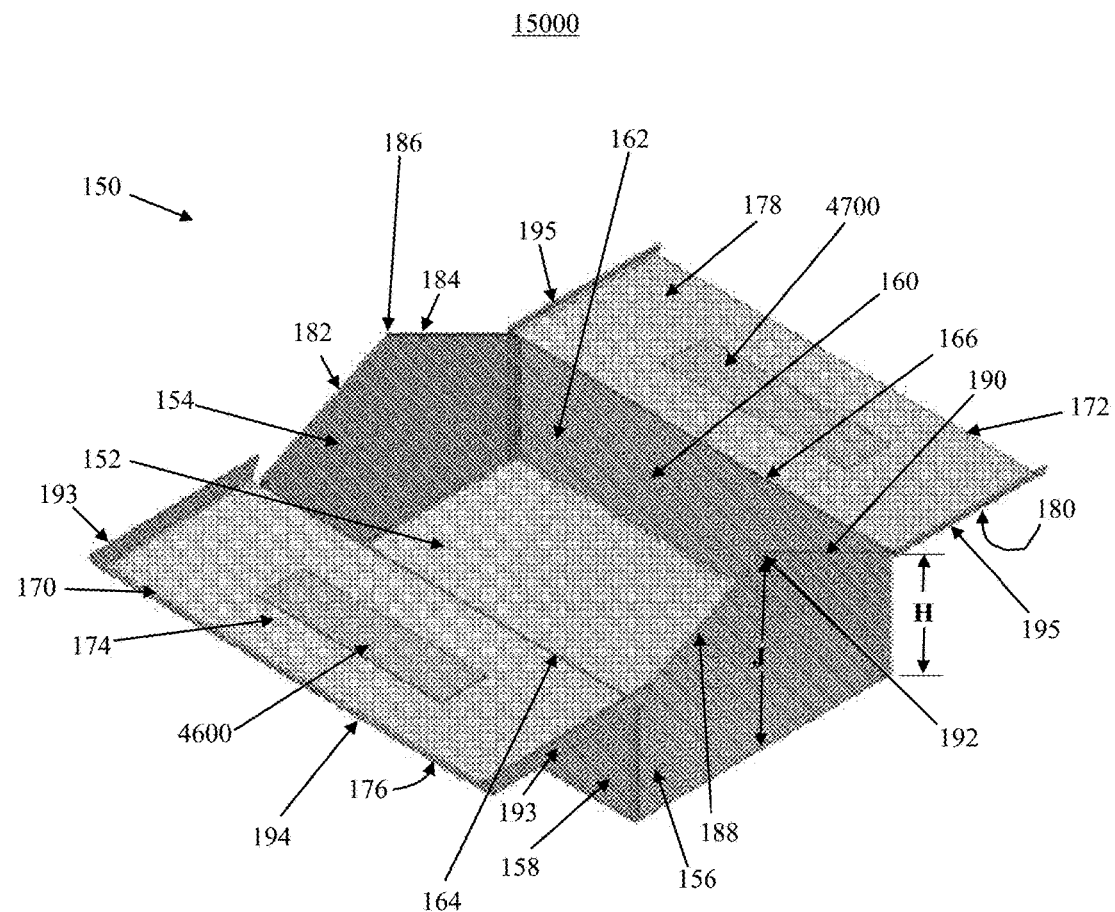
FIG. 15 is a perspective view of an exemplary embodiment of a system 15000 with the lid fully open.
Figure 16:
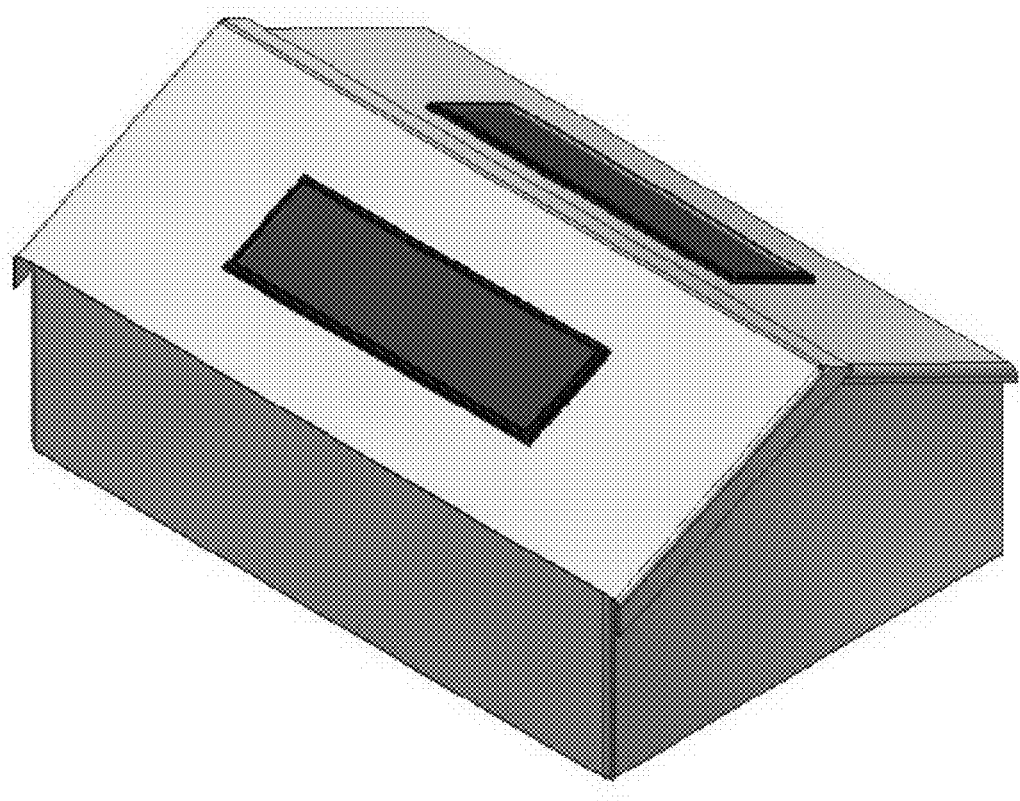
FIG. 16 is a perspective view of an exemplary embodiment of a system 16000 with the lid closed.

FIG. 15 is a perspective view of an exemplary embodiment of a system 15000 with the lid fully open. As shown therein, the elongated receptacle 150 includes a floor 152, a first wall 154, a second wall 156 opposite the first wall 154, a third wall 158 and a fourth wall 160 opposite the third wall 158, wherein the walls 154, 156, 158 and 160 and the floor 152 form an internal area 162 of the receptacle 150 wherein deliveries can be received and maintained. Third wall 158 has a third wall top edge 164 and fourth wall 160 has a fourth wall top edge 166, and each of the top edges 164, 166 extends to the same or substantially the same height H above the floor 152. The first wall 154 includes a pair of first wall rising upper edges 182, 184 that extend from the portion of wall 154 at height H and meet at a first wall apex 186, and the second wall 156 includes a pair of second wall rising upper edges 188, 190 that extend from the portion of wall 156 at height H and that meet at a second wall apex 192. The first wall apex 186 and the second wall apex 192 are the same or substantially the same height J above the floor 152, and height J is greater than height H. A first flap 170 is secured to the third wall top edge 164 and a second flap 172 is secured to the fourth wall top edge 166. The first flap 170 includes a first flap interior surface 174 and a first flap exterior surface 176 and the second flap 172 includes a second flap interior surface 178 and a second flap exterior surface 180. The first 170 and second 172 flaps form the openable lid 4110 shown in FIG. 4, and have respective resting positions along the rising upper edges 182, 184, 188, 190 of first 154 and second 156 walls. Specifically, first flap 170 has a resting position whereby first flap interior surface 178 rests in part upon rising upper edge 182 of first wall 154 and rising upper edge 188 of second wall 156. Second flap 172 has a resting position whereby second flap interior surface 178 rests in part upon rising upper edge 184 of first wall 154 and rising upper edge 190 of second wall 156. First flap 170 also includes first flap side edge overlap elements 193 and a top edge overlap element 194, and second flap 172 includes second flap side edge overlap elements 195. The top edge overlap element 194 of first flap 170 can overlap a portion of the second flap 172 when the lid is closed as shown in FIGS. 4 and 16. The solar panel 4600 of FIG. 4 is shown on the first flap 170 and the snow detector 4700 of FIG. 4 is shown on the second flap 172.

FIG. 16 is a perspective view of an exemplary embodiment of a system 16000 with the lid closed.

Figure 17:
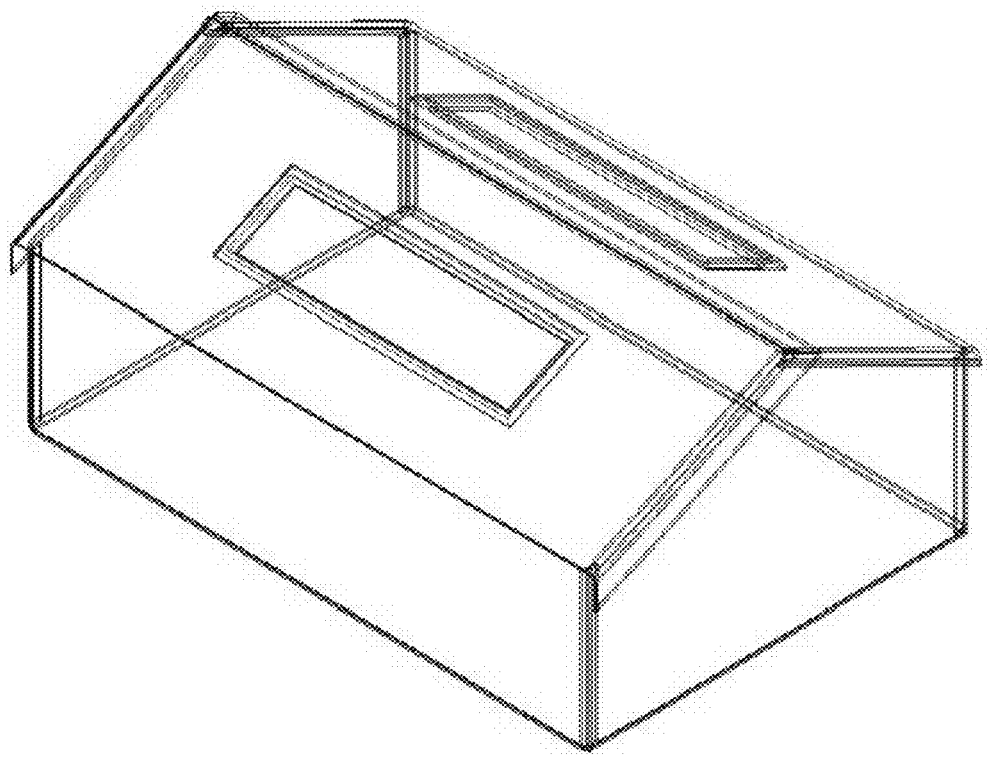
FIG. 17 is a perspective view of an exemplary embodiment of a system 17000.

FIG. 17 is a perspective view of an exemplary embodiment of a system 17000.

Figure 18:
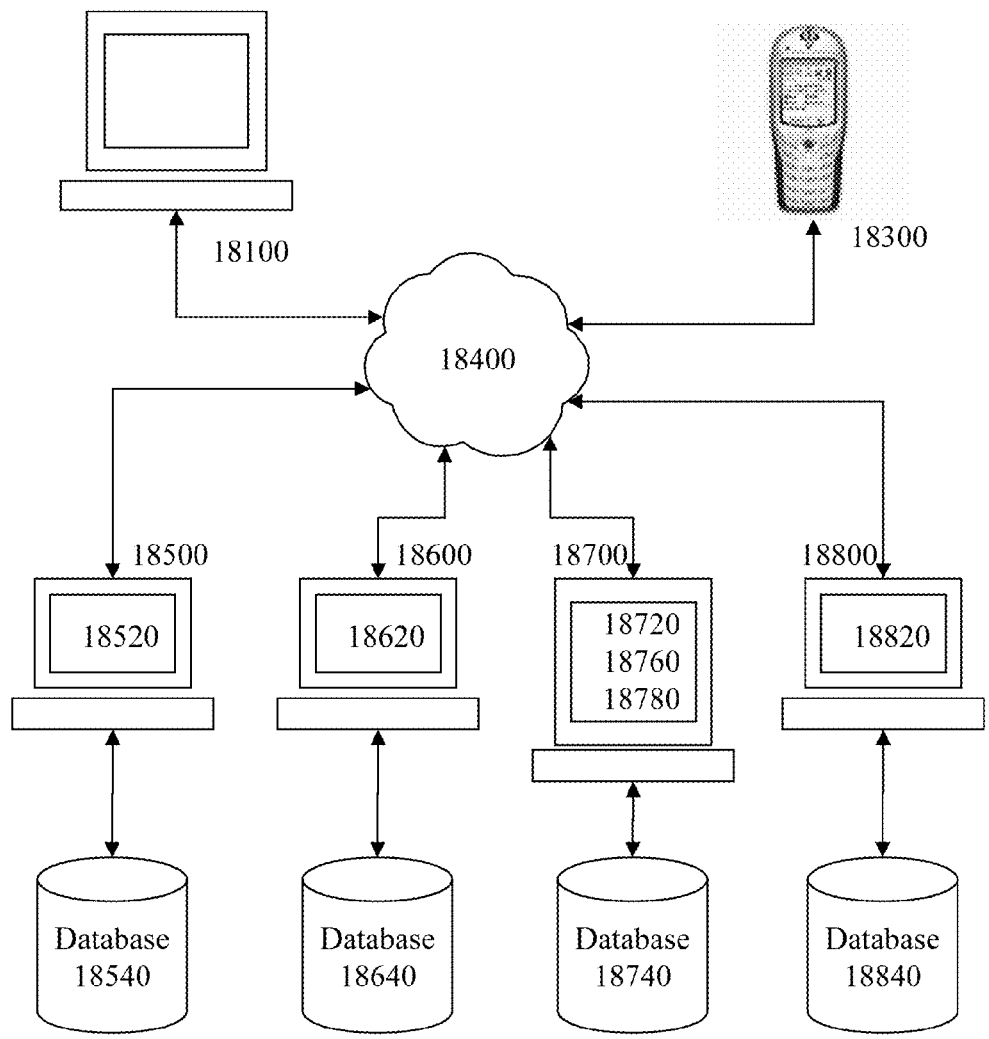
FIG. 18 is a block diagram of an exemplary embodiment of a system 18000.

FIG. 18 is a block diagram of an exemplary embodiment of a system 18000, which can comprise a smartphone 18300, an information device 18100, a network 18400, a first server 18500, a second server 18600, a third server 18700, and a fourth server 18800. First server 18500 can comprise a first user interface 18520 and can be coupled to a first database 18540. Second server 18600 can comprise a second user interface 18620 and can be coupled to a second database 18640. Third server 18700 can comprise a third user interface 18720, a processor 18760, machine instructions 18780, and can be coupled to a third database 18740. Fourth server 18800 can comprise a fourth user interface 18820 and can be coupled to a first database 18840. Any of the methods and/or steps thereof can be carried out in whole or in part by smartphone 18300, information device 18100 and/or first server 18500. Second server 18600, third server 18700, and/or fourth server 18800 can each be associated with a financial institution and each can comprise rewards and/or account information concerning financial accounts stored in memory devices coupled thereto. In certain exemplary embodiments, system 18000 can be used to implement one or more methods disclosed herein.

Figure 19:
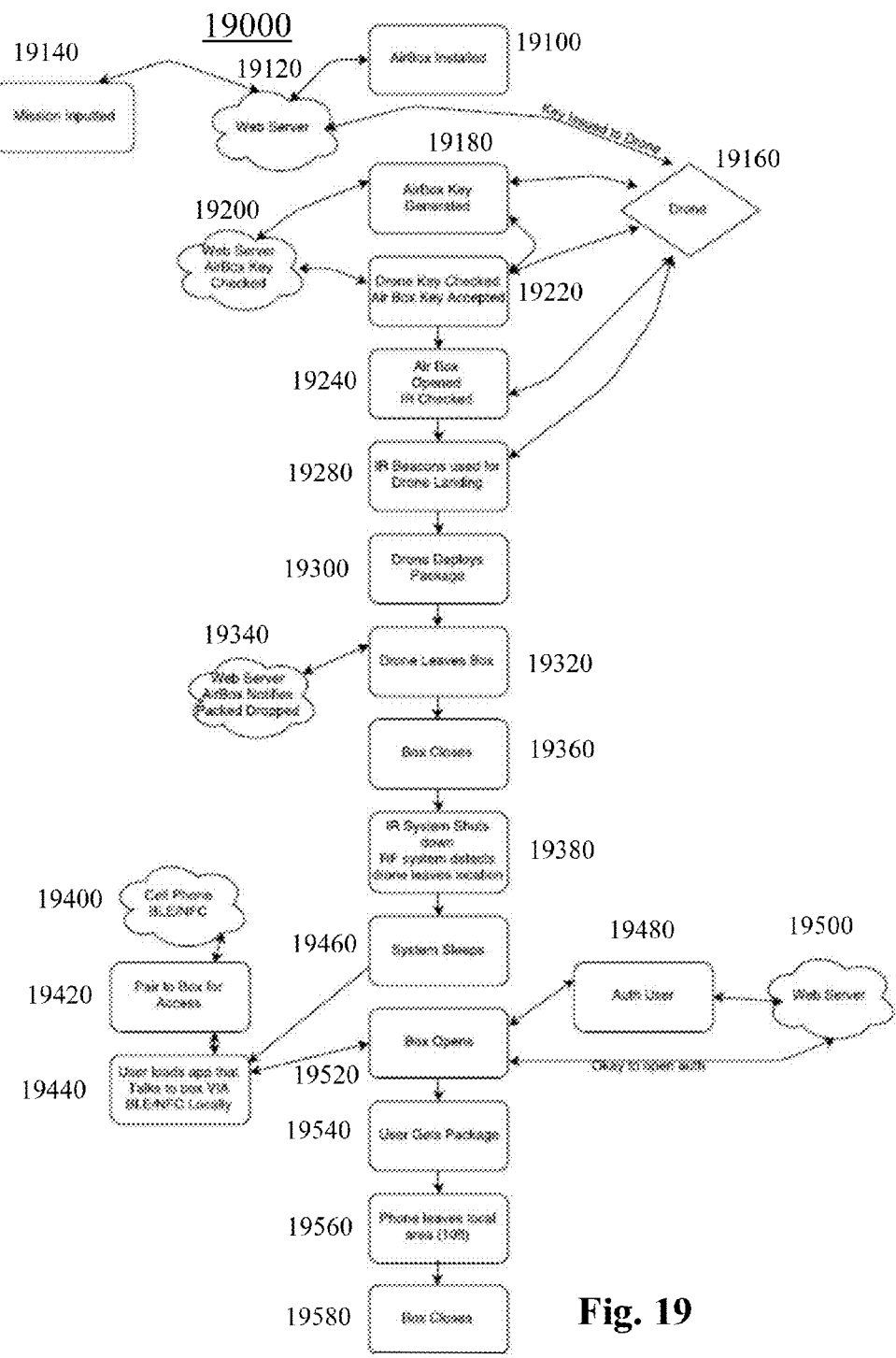
FIG. 19 is a flowchart of an exemplary embodiment of a method 19000.

FIG. 19 is a flowchart of an exemplary embodiment of a method 19000. At activity 19100, an AirBox can be installed. At activity 19120, the AirBox can communicate with a web server. At activity 19140, a mission can be inputted to the web server such that a drone delivery is scheduled to the AirBox. At activity 19160, a key can be issued to the drone. In certain exemplary embodiments, the key can be an electronic key via which the drone can securely deliver a package to the AirBox. At activity 19180, an AirBox key can be generated and communicated to the drone. At activity 19200, the web server can check the AirBox key. At activity 19220, the drone key can be checked and the AirBox key can be accepted such that the drone can open the AirBox when the delivery is made.

At activity 19240, the AirBox can be opened via an infrared signal, which can be checked for validity. At activity 19280, one or more infrared beacons can be used for causing the drone to land for delivery of the package to the AirBox. At activity 19300, the drone can deploy the package to the AirBox. At activity 19320, the drone can leave the package at the AirBox. In certain exemplary embodiments, the drone can be electrically coupled to a power system of the AirBox to recharge one or more batteries of the drone such that the drone has sufficient power for a return flight from the AirBox. At activity 19340, the AirBox can notify the web server that the package has been delivered. At activity 19360, the AirBox can be closed responsive to a signal from the drone.

At activity 19380, the infrared signaling system can shut down and/or a radio frequency system can detect that the drone has left the location of the AirBox. At activity 19400, an information device (e.g., a cell phone) of a user can receive a signal about a drone delivery such as via Bluetooth low energy ("BLE") and/or near field communication ("NFC"). At activity 19420, the information device of the user can be paired with the AirBox such that the user can securely access the AirBox, but others will be excluded from being able to open the AirBox to retrieve packages therefrom. At activity 19440, the user can load an app (i.e., machine instructions called application software) that communicates with the AirBox via BLE and/or NFC locally. At activity 19460, the system can sleep such that power is conserved. At activity 19480, an authorized user can be identified by the AirBox and/or via the web server at activity 19500. The web server can communicate with the AirBox sending a signal that confirms that the AirBox is authorized to open.

At activity 19520, the AirBox can open such that the user can retrieve the package for use at activity 19540. At activity 19560, the information device (e.g., cell phone) can leave the local area of the AirBox. At activity 19580, the AirBox can close until another drone delivery is made.

Figure 20:
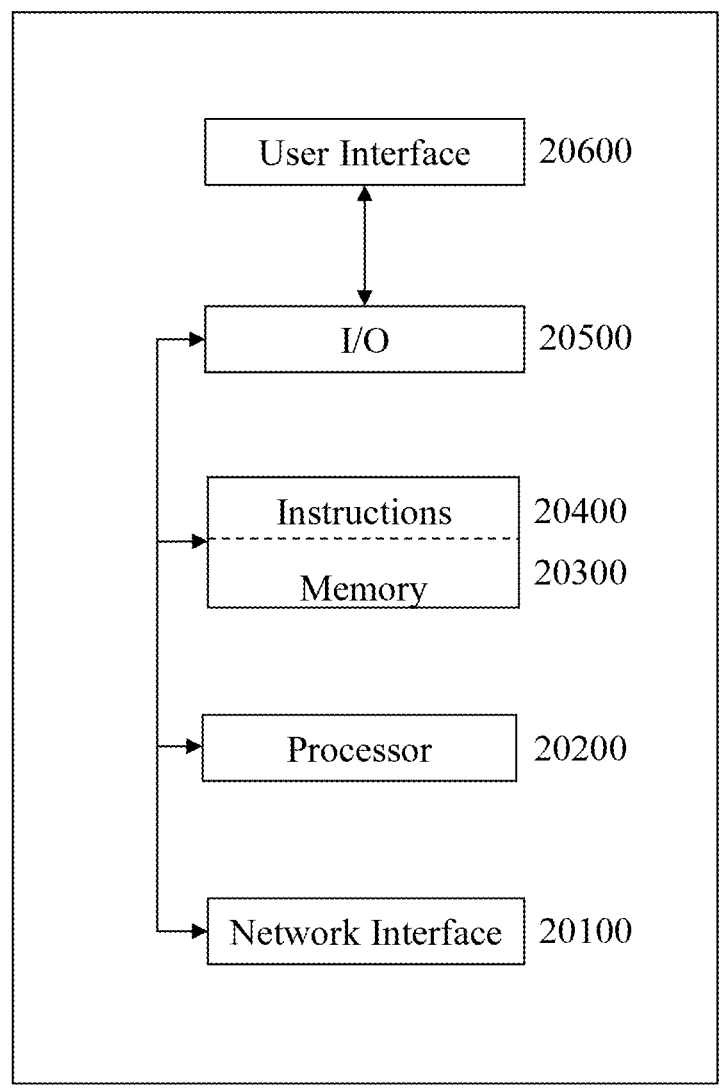
FIG. 20 is a block diagram of an exemplary embodiment of an information device 20000.

FIG. 20 is a block diagram of an exemplary embodiment of an information device 20000, which in certain operative embodiments can comprise, for example, first information device 4400 of FIG. 4. Information device 20000 can comprise any of numerous circuits and/or components, such as for example, one or more network interfaces 20100, one or more processors 20200, one or more memories 20300 containing instructions 20400, one or more input/output (I/O) devices 20500, and/or one or more user interfaces 20600 coupled to I/O device 20500, etc.

In certain exemplary embodiments, via one or more user interfaces 2600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

access—ability to enter a container.

activity—an action, act, step, and/or process or portion thereof.

actuator—a type of motor that is responsible for moving or controlling a mechanism or system.

adapter—a device used to effect operative compatibility between different parts of one or more pieces of an apparatus or system.

AirBox—a receptacle comprising a lid that is constructed to receive deliveries from a drone.

and/or—either in conjunction with or in alternative to.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

battery—a combination of two or more cell electrically connected to work together to produce electric energy.

biometric identifier—a distinctive, measurable characteristic used to identify an individual; for example, fingerprint, palm veins, face recognition, DNA, palm print, hand geometry, iris recognition, retina and odor/scent, typing rhythm, gait, and/or voice, etc.

Bluetooth low energy specification 3.0 or greater—a wireless network technology designed and marketed by the Bluetooth Special Interest Group developed as specification 3.0 or higher; the technology provides relatively low power consumption and cost while maintaining a reasonably good communication range.

can—is capable of, in at least some embodiments.

cause—to produce an effect.

circuit—an electrically conductive pathway and/or a communications connection established across two or more switching devices comprised by a network and between corresponding end systems connected to, but not comprised by the network.

close—to conceal an interior of an AirBox via a lid.

communicate—to convey information.

comprising—including but not limited to.

configure—to make suitable or fit for a specific use or situation.

connect—to join or fasten together.

constructed to—made suitable or fit for a specific use or situation.

control—to exercise restraining or directing influence over.

convert—to transform, adapt, and/or change.

coupleable—capable of being joined, connected, and/or linked together.

coupling—linking in some fashion.

create—to bring into being.

data—distinct pieces of information, usually formatted in a special or predetermined way and/or organized to express concepts.

define—to establish the outline, form, or structure of.

delivery—the carrying and turning over of letters, goods, etc., to a designated recipient.

determine—to obtain, calculate, decide, deduce, and/or ascertain.

device—a machine, manufacture, and/or collection thereof.

drone—an unmanned aircraft or ship guided by remote control.

energy—a power supply or source that allows an apparatus or system to do work.

estimate—to calculate and/or determine approximately and/or tentatively.

flap—a portion of a cover or lid.

food—substances that are consumable by animals.

generate—to create, produce, give rise to, and/or bring into existence.

global positioning system—a navigational system using satellite signals to fix the location of a radio receiver on or above the earth's surface.

grocery—a food item.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

heater—an apparatus that imparts thermal energy to an object or space.

hinge—a jointed or flexible apparatus that allows a lid to swing open or closed.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

infrared communication—a modulated beam (i.e., a beam that is switched on and off, to encode data) that comprises electromagnetic radiation with longer wavelengths than those of visible light, extending from the nominal red edge of the visible spectrum at approximately 700 nanometers (frequency 430 THz) to approximately 1 mm (300 GHz). An infrared remote control is often bundled with many consumer electronics. Infrared transmit and receive systems are inexpensive and are generally reliable. The carrier frequency of such infrared signals is typically in the order of around 38 kHz.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

interior—a portion within limiting boundaries.

key—an instrument via which a lock is turned and opened.

lid—a movable cover of an AirBox.

location—a site occupied by something.

lock—an apparatus that secures a lid in a closed position that cannot be opened unless a specific key, biometric determination, and/or access code, etc. is used.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

mail—letters and/or packages.

maintain—to keep in a state.

may—is allowed and/or permitted to, in at least some embodiments.

medicine—a substance that treats an illness.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

open—to expose an interior of an AirBox.

overlap—to extend over an edge of another flap.

package—a parcel.

pharmaceutical—a medicinal drug.

pizza—a dish made comprising flattened bread dough spread with a savory mixture usually including tomatoes and cheese and often other toppings and baked.

plurality—the state of being plural and/or more than one.

power supply—a source of electrical energy.

predetermined—established in advance.

prescription—a medicine prepared from a written direction for the preparation, compounding, and administration thereof.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

radio frequency communication—radio frequency ("RF") remote controls do not require line of sight and do not have to be aimed at target equipment. An RF remote can be operated from another room. Held in the hand like a cellphone, the buttons are pressed in the same straightforward manner. RF communication offers greater range than infrared. It is omni-directional and allows the control of devices in other rooms. Exemplary systems utilize 2.4 GHz RF. There are many different coding systems in use and generally different manufacturers use different codes and different data rates for transmission. In some embodiments, IR signals are sent one way, in a low-speed burst for distances of up to 30 feet.

range—an extent of variation of a variable.

receive—to get as a signal, take, acquire, and/or obtain.

receiver—an apparatus that obtains electromagnetic signals.

recommend—to suggest, praise, commend, and/or endorse.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

resist—to withstand.

responsive—as a result of, or in reaction to.

restrict—to limit.

retail store item—a purchased good.

select—to make a choice or selection from alternatives.

set—a related plurality.

sheet metal—comprising a relatively thin plate of a class of elementary substances, as gold, silver, or copper, all of which are crystalline when solid.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

sleep mode—a low power consumption mode.

snow detector—an apparatus that detects a presence of snow on a lid of an AirBox.

solar panel—an apparatus constructed to receive energy from the sun and convert that energy to electrical energy.

store—to place, hold, and/or retain data, typically in a memory.

substantially—to a great extent or degree.

support—to bear the weight of, especially from below.

survival supplies—equipment or goods usable for sustaining life.

system—a collection of mechanisms, devices, machines, articles of manufacture, processes, data, and/or instructions, the collection designed to perform one or more specific functions.

temperature—a degree of hotness measured on a definite scale.

thermally insulated—comprising one or more materials that reduce heat transfer.

transmit—to send as a signal, provide, furnish, and/or supply.

transmitter—an apparatus that sends electromagnetic signals.

user—a human that employs the service of something.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

weight—a value indicative of importance.

Wi-Fi—a wireless networking technology that uses radio waves to provide wireless high-speed Internet and network connections.

wireless—operating by means of transmitted electromagnetic waves and lacking communication wires.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;
 no characteristic, function, activity, or element is "essential";
 any elements can be integrated, segregated, and/or duplicated;
 any activity can be repeated, any activity can be performed by multiple entities, and/or any activity can be performed in multiple jurisdictions; and
 any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
 an elongated receptacle comprising a plurality of walls having a first height, with at least two of the plurality of walls having a respective pair of upper edges extending from the first height to a second height at an apex of the receptacle;
 an automatically openable lid comprising at least two flaps, with each of the at least two flaps being secured to a respective one of the plurality of walls of the receptacle, with a first of the at least two flaps having a first flap resting position extending downwardly from the apex at an angle along a first of the pair of upper edges of a first of the at least two of the plurality of walls and further along a first of the pair of upper edges of a second of the at least two of the plurality of walls, wherein a second of the at least two flaps has a second flap resting position extending downwardly from the apex at an angle along a second of the pair of upper edges of the first of the at least two of the plurality of walls and further along a second of the pair of upper edges of the second of the at least two of the plurality of walls, wherein a portion of the first flap in the first flap resting position overlaps a portion of the second flap in the second flap resting position, and wherein each of the first and second of the at least two flaps has an exterior surface, and wherein a solar panel is mounted to the exterior surface of at least the first or second of the at least two flaps;
 a communication device that receives signals concerning a delivery from a drone, wherein said signals cause:
 the first and second of the at least two flaps of said automatically openable lid to open to respective open positions to receive said delivery from said drone; and
 the first and second of the at least two flaps of said automatically openable lid to close to respective resting positions after receipt of said delivery from said drone.

2. The system of claim 1, further comprising: said drone.

3. The system of claim 1, further comprising:
 a first information device that receives said signals and, responsive to said signals, said first information device causes said automatically openable lid to open to receive said delivery from said drone; and
 a second information device that controls said delivery from said drone.

4. The system of claim 1, further comprising:
 a transmitter constructed to communicate a global positioning system determined location of said elongated receptacle with a second information device controlling said delivery from said drone.

5. The system of claim 1, further comprising:
 a power supply comprising a battery, said power supply constructed to provide electrical energy to an information device and to open said automatically openable lid.

6. The system of claim 1, further comprising:
 an information device that controls said delivery from said drone.

7. The system of claim 1, further comprising:
 a snow detector secured to the first or the second flap, said snow detector constructed to cause said automatically openable lid to open such that snow falls off of said automatically openable lid.

8. The system of claim 1, further comprising: a power system that recharges one or more batteries of said drone.

9. The system of claim 1, wherein:
 said automatically openable lid has overlapping flaps, said overlapping flaps constructed to resist rain entry into said elongated receptacle.

10. The system of claim 3, wherein:
said first information device is constructed to cause said system to enter a sleep mode until a signal is received from said drone.

11. The system of claim 1, wherein:
said elongated receptacle comprises sheet metal.

12. The system of claim 1, wherein:
hinges of said automatically openable lid do not reduce an internal volume of said elongated receptacle.

13. The system of claim 1, wherein:
said automatically openable lid is opened via a single actuator.

14. The system of claim 1, wherein:
said automatically openable lid is opened via dual actuators.

15. The system of claim 1, wherein:
said elongated receptacle comprises a heater, said heater constructed to maintain an interior of said elongated receptacle within a predetermined temperature range.

16. The system of claim 1, wherein:
said elongated receptacle is thermally insulated and comprises a heater, said heater constructed to maintain an interior of said elongated receptacle within a predetermined temperature range.

17. The system of claim 1, wherein:
said elongated receptacle comprises a lock, said lock constructed to restrict access to said elongated receptacle from anyone except a user of said elongated receptacle.

18. The system of claim 1, wherein:
said elongated receptacle comprises a lock, said lock constructed to restrict access to said elongated receptacle from anyone except a user of said elongated receptacle via a key.

19. The system of claim 1, wherein:
said elongated receptacle comprises a lock, said lock constructed to restrict access to said elongated receptacle from anyone except a user of said elongated receptacle via a biometric identifier.

20. The system of claim 1, wherein: said elongated receptacle comprises a plurality of hinges.

21. The system of claim 1, wherein: said delivery comprises food.

22. The system of claim 1, wherein: said delivery comprises mail.

23. The system of claim 1, wherein:
said delivery comprises at least one of prescriptions, pharmaceuticals, survival supplies, packages, medicine, grocery, or a retail store item.

* * * * *